United States Patent [19]

Dragotta

[11] Patent Number: 5,953,804
[45] Date of Patent: Sep. 21, 1999

[54] AUTOMATED WORKPIECE INSERTION METHOD AND APPARATUS

[75] Inventor: Kenneth J. Dragotta, Hartland, Wis.

[73] Assignee: Systems Engineering Company, Milwaukee, Wis.

[21] Appl. No.: 09/108,348

[22] Filed: Jul. 10, 1998

[51] Int. Cl.$^6$ .................................................. B23Q 17/00
[52] U.S. Cl. .......................... 29/407.1; 29/468; 29/281.4; 414/814; 901/15
[58] Field of Search .............................. 29/464, 468, 821, 29/428, 700, 722, 743, 744, 822, 407.01, 708, 709, 281.4, 281.5, 407.1; 414/814, 816; 901/15

[56] References Cited

U.S. PATENT DOCUMENTS

| | | |
|---|---|---|
| Re. 33,641 | 7/1991 | Ackerman . |
| 3,824,674 | 7/1974 | Inoyama et al. . |
| 3,965,562 | 6/1976 | Inoyama . |
| 4,179,783 | 12/1979 | Inoyama et al. . |
| 4,260,941 | 4/1981 | Engelberger et al. . |
| 4,509,252 | 4/1985 | Sabatino et al. ................. 29/623.1 |
| 4,573,271 | 3/1986 | Hamilton et al. . |
| 4,598,456 | 7/1986 | McConnell ....................... 29/407 |
| 4,630,344 | 12/1986 | Boyle et al. ...................... 29/149.5 |
| 4,694,230 | 9/1987 | Slocum et al. ................... 318/568 |
| 4,707,907 | 11/1987 | Ivanov ............................. 29/525 |
| 4,736,517 | 4/1988 | Wright et al. ..................... 29/741 |
| 4,738,015 | 4/1988 | Kato . |
| 4,810,018 | 3/1989 | Van De Ven et al. ............ 294/88 |
| 4,816,732 | 3/1989 | Wilson ............................. 318/568 |
| 5,487,580 | 1/1996 | Kugo . |
| 5,507,085 | 4/1996 | Easton et al. .................... 29/407.04 |
| 5,538,305 | 7/1996 | Conway et al. .................. 294/119.1 |
| 5,539,981 | 7/1996 | Burcham et al. ................. 29/888.061 |
| 5,619,782 | 4/1997 | Tanaka et al. .................... 29/407.1 |

FOREIGN PATENT DOCUMENTS

| | | | |
|---|---|---|---|
| 56-39842 | 4/1981 | Japan ................................. | 29/281.4 |
| 57-89534 | 6/1982 | Japan ................................. | 29/281.4 |
| 58-45828 | 3/1983 | Japan ................................. | 29/700 |
| 58-71038 | 4/1983 | Japan ................................. | 29/700 |
| 60-94235 | 5/1985 | Japan ................................. | 29/821 |
| 61-236437 | 10/1986 | Japan ................................. | 29/281.5 |
| 63-299400 | 12/1988 | Japan ................................. | 29/743 |
| 4-130798 | 5/1992 | Japan ................................. | 29/743 |
| 5-116075 | 5/1993 | Japan ................................. | 29/281.5 |
| 5-145293 | 6/1993 | Japan ................................. | 29/743 |
| 1007-897-A | 3/1983 | U.S.S.R. ............................ | 29/700 |
| 1537-437-A | 1/1990 | U.S.S.R. ............................ | 29/821 |

OTHER PUBLICATIONS

JP 6–32264 abstract, Feb. 1994.
SU 1328–137–A abstract, Aug. 1987.
JP 4–93130 abstract, Mar. 1992.
JP 63–89232 abstract, Apr. 1988.
JP 61–142033 abstract, Jun. 1986.
JP 60–172427 abstract, Sep. 1985.

*Primary Examiner*—David P. Bryant
*Assistant Examiner*—John Preta
*Attorney, Agent, or Firm*—Andrus, Sceales, Starke & Sawall

[57] ABSTRACT

A method and apparatus for positioning a plurality of workpieces in a tightly spaced array within a guide block. The apparatus of the invention includes an insertion head mounted to a robot assembly arm. The insertion head includes a pair of resiliently mounted gripper fingers that can be operated to pick up an individual workpiece from a supply station. The gripper fingers include a spring member that biases the gripper fingers into an engagement position. Once the workpiece has been acquired by the insertion head, the insertion head is used to alternately rotate the workpiece while applying a downward force to slide the workpiece into the defined location within a receptacle. After the workpiece has been inserted, the gripper fingers are moved to their retracted position to press the workpiece completely downward into the receptacle.

10 Claims, 10 Drawing Sheets

AUTOMATED WORKPIECE INSERTION METHOD AND APPARATUS

BACKGROUND OF THE INVENTION

The present invention relates to a method and apparatus for positioning a plurality of workpieces in a tightly spaced array within a guide block. More specifically, the present invention relates to a pair of fingers positioned on a robot arm capable of positioning a plurality of workpieces in a closely spaced array.

Currently, in many types of sensitive electronic x-ray machines, a plurality of sensing elements are positioned in a tightly spaced array with minimal spacing between adjacent sensing elements. To construct the array of sensing elements, the individual sensing elements are inserted individually into a guide block. Typically, this process is performed by a human worker, since the tight spacing between the sensing elements requires a degree of manual dexterity currently not available in robotic assembly systems.

During the installation of the sensing elements within the guide block, the human worker typically wiggles the sensing element back and forth until the sensing element slides downward between spacers within the guide blocks. In many applications, the clearance between the edges of the sensing elements and the spacers within the guide block is typically much less than the width of the sensing element, such that the sensing elements tightly fit within the guide block. By wiggling the sensing element as it is pressed downward into the guide block, the human assembly person is able to correctly guide the sensing element into the guide block.

Since the assembly process described above requires a human assembly person, the cost of assembling the array of sensing elements is often quite high. Additionally, the job of assembling the array is a tedious and repetitive process that provides a somewhat undesirable work environment.

In prior attempts to develop an automated system to assemble an array similar to that described above, it was found that available robot assembly arms proved to be too inflexible when inserting the delicate sensing elements. For example, when the previously available robot arm attempted to insert the sensing elements into the tightly spaced guide blocks, the robot arm would simply press the sensing element downward into the guide block. Because of the tight spacing within the guide block, the sensing element would pinch and prevent the sensing element from being inserted into the guide block. When the robot arm would continue to apply the insertion force, the robot arm would oftentimes fracture the brittle and thin sensing element. Therefore, a need exists for an automated assembly method and apparatus for inserting a plurality of delicate sensing elements into a tightly spaced array within a guide block.

It is an object of the present invention to provide an automated assembly mechanism capable of inserting delicate workpieces into a tightly spaced guide block. It is a further object of the invention to provide an assembly station in which a robot arm including specially designed gripper fingers select an individual sensing element from a supply and insert the individual sensing element into a guide block. It is a further object of the invention to provide a method of inserting the sensing element into the guide block by alternatively rotating the sensing element in opposed directions while applying an insertion force in a direction to force the sensing elements into the guide block. It is a further object of the invention to provide a pair of gripper fingers on the robot arm that include a resilient mounting structure that allows the gripper fingers to separate when rotation of the sensing element is restricted to prevent fracture of the sensing element. It is a further object of the invention to provide a method of assembling a plurality of sensing elements in a spaced array in which the space between the individual sensing elements is less than the width of the gripper fingers.

SUMMARY OF THE INVENTION

The present invention is a method and apparatus for inserting a plurality of workpieces into a receptacle to form a tightly spaced array of workpieces. An assembly mechanism is used to individually grasp the workpieces and insert the workpieces into an open slot within a receptacle. The assembly mechanism includes a robot arm having an insertion head. The insertion head includes an upper rotatable drive portion, an intermediate drive portion, and a pair of gripper fingers. The gripper fingers are pivotally mounted to a pair of mounting blocks on the intermediate drive portion. The mounting blocks are movable between an extended position and a retracted position, such that the distance between the pair of gripper fingers can be adjusted. When the mounting blocks are moved to the retracted position, the gripper fingers close to capture an individual workpiece between the fingers.

Each of the gripper fingers is mounted to one of the mounting blocks by a resilient mounting structure. The resilient mounting structure includes a spring member positioned between an arm on the gripper finger and the mounting block. The spring element exerts a bias force to pivot the gripper finger into a gripping position.

The intermediate drive portion is mounted within the upper, rotatable drive portion to permit movement between the drive portions. At least one sensor is mounted between the intermediate drive portion and the upper drive portion to indicate when the gripper fingers or workpiece contacts an immovable object in the downward direction.

In accordance with the method of the present invention, the robot arm moves the insertion head into position to select a workpiece from a supply station. To select a workpiece, the gripper fingers are moved to their extended position and moved downward above one of the workpieces. The gripper fingers are then moved to the retracted position, at which time the workpiece is retained below a pair of ridges on each of the gripper fingers.

Once the workpiece is retained between the gripper fingers, the workpiece is positioned within an alignment station and released. The workpiece is pressed against a stop element in the alignment station and then regripped by the gripper fingers. In this manner, the alignment station allows the workpiece to be gripped in a known location by the gripper fingers.

After the gripper fingers reacquire the workpiece, the robot arm moves the gripper fingers and workpiece into the proper alignment above an empty open slot in the receptacle. The robot arm moves the workpiece downward into contact with the open slot. Since the clearance between the open slot and the workpiece is minimal, the robot arm cannot simply press the workpiece downward into the open slot. According to the method of the present invention, the workpiece is dithered by rotating the workpiece in a first direction. When the workpiece contacts the outer edge of the open slot, further rotation causes each of the gripper fingers to flex outward. This flex of the gripper fingers prevents fracture of the workpiece.

After rotation in the first direction is complete, the workpiece is rotated in the opposite direction. Again, the workpiece will contact one edge of the open slot to prevent further rotation. The gripper fingers again flex outward to prevent fracture of the workpiece. After the workpiece has been dithered as discussed, a downward force is again applied to press the workpiece further into the open slot within the receptacle. This process is repeated until the gripper fingers can no longer press the workpiece any further into the attachment slot due to the adjacent workpieces.

The gripper fingers then release the workpiece and are raised slightly above the workpiece. The gripper fingers are moved to their completely retracted position at which time the distance between the gripper fingers is less than the thickness of the workpiece. The gripper fingers are then moved downward into contact with the workpiece to completely press the workpiece into the open slot.

After the assembly mechanism of the invention has assembled an array of workpieces, the receptacle is moved to a heating station at which time a plastic layer in the receptacle is heated to securely retain the workpieces in the tightly spaced array.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
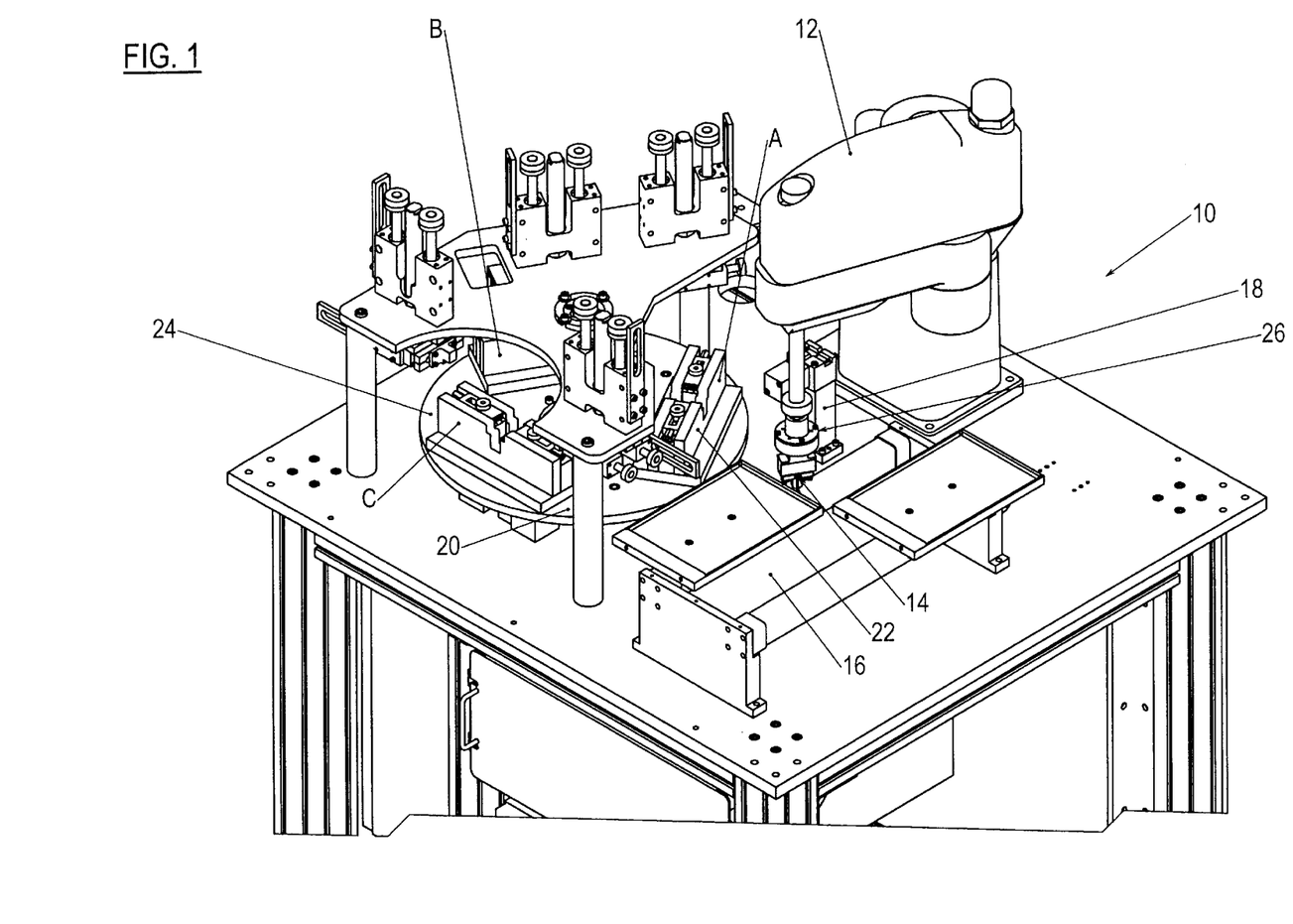
FIG. 1 is a perspective view of the assembly mechanism of the present invention.
Figure 2:
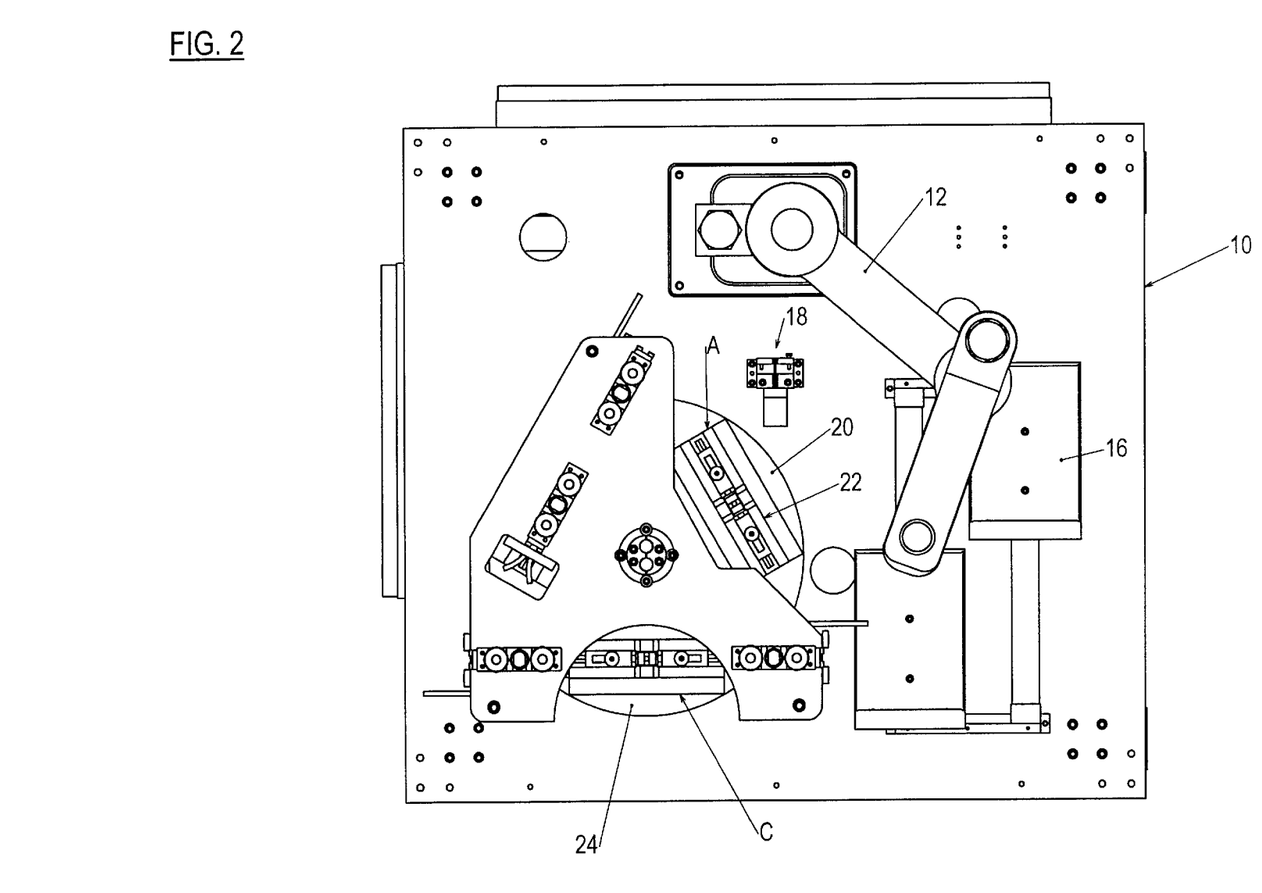
FIG. 2 is a top view of the assembly mechanism of the present invention.

FIG. 1 illustrates an assembly mechanism 10 for inserting a plurality of workpieces into a receptacle in a closely spaced array. The assembly mechanism 10 generally includes a robot assembly arm 12 including a pair of gripper fingers 14, a workpiece supply station 16, an alignment station 18, and an insertion station 20. The assembly mechanism 10 generally transfers a supply of workpieces from the supply station 16 to a receptacle positioned on one of three guide blocks 22 contained on the insertion station 20. As can be seen in FIGS. 1 and 2, the insertion station 20 includes a rotatable platform 24 that allows the guide blocks 22 to be sequentially rotated into position to be loaded by the robot assembly arm 12 in a manner as will be discussed below.

Figure 3:
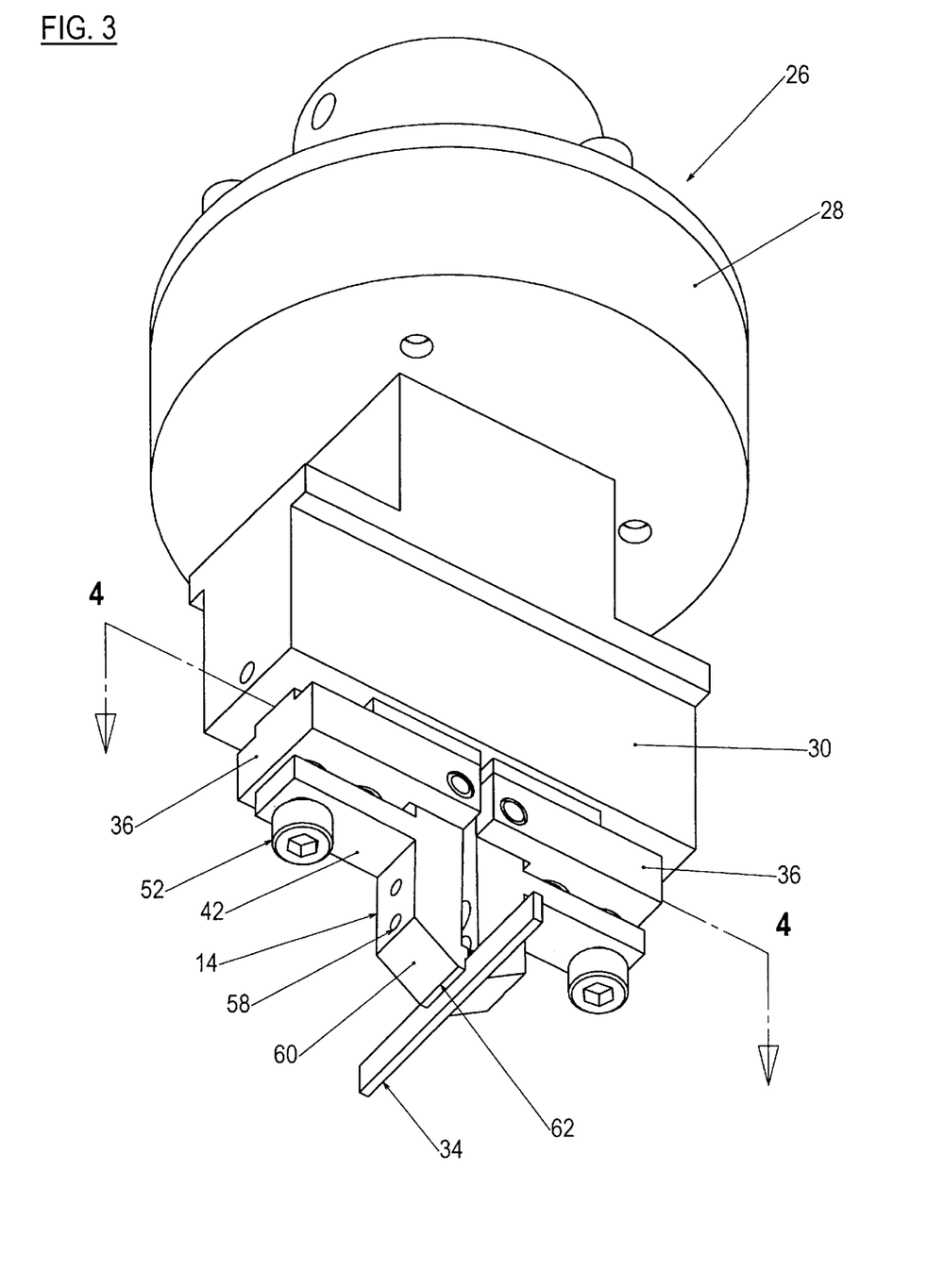
FIG. 3 is a perspective view of the insertion head, including the gripper fingers of the present invention.

Referring now to FIG. 3, thereshown is the insertion head 26 of the present invention. The insertion head 26 includes an upper portion 28, an intermediate drive section 30 and the pair of gripper fingers 14. As shown in FIG. 3, the gripper fingers 14 are sized to receive and retain a workpiece 34. In the embodiment of the invention shown in the figures, the workpiece 34 is a sensing element constructed of Lumex® that is used in emerging x-ray technology. The sensing element shown in the preferred embodiment is 1½ inches in length by ¼ inch high by ¹⁄₁₆ inch wide. The sensing element thus is very thin and very brittle.

The intermediate drive section 30 includes internal components that operate to move mounting blocks 36 toward and away from each other along a longitudinal axis. As the mounting blocks 36 are moved by the intermediate drive section 30, the distance between the pair of gripper fingers 14 increases or decreases, depending on the direction of movement. Thus, the movement of the mounting blocks 36, and thus the gripper fingers 14, allows the gripper fingers 14 to grip and retain the workpiece 34.

Figure 4:
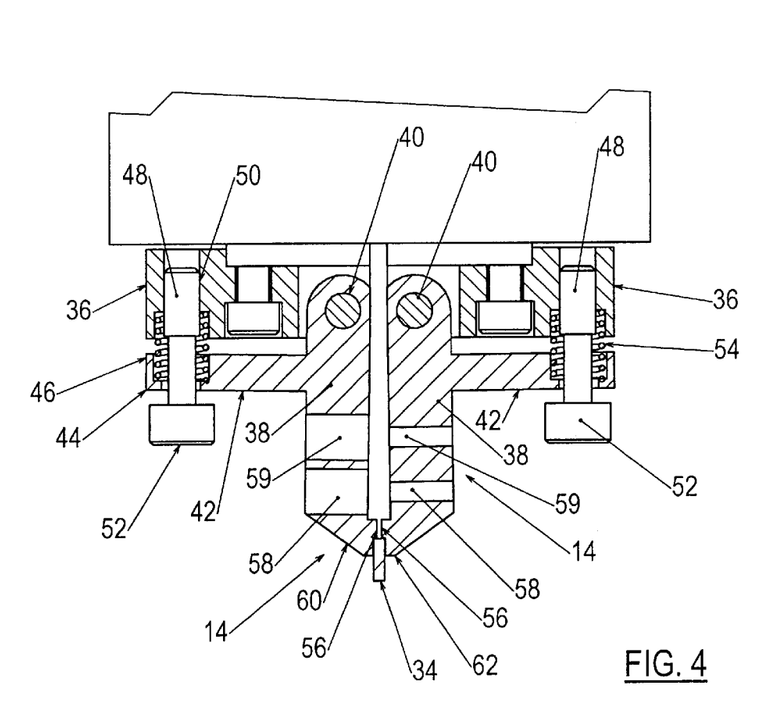
FIG. 4 is a sectional view taken along line 4—4 in FIG. 3 showing the gripper fingers and mounting arrangement.

Referring now to FIG. 4, thereshown is the mounting arrangement for each of the gripper fingers 14 on the mounting blocks 36. A main body portion 38 of each gripper finger 14 is mounted to one of the mounting blocks 36 by a pivot point 40. Each of the gripper fingers 14 includes an arm 42 extending normally from the longitudinal axis of the main body 38. Each of the arms 42 includes an opening 44 near its outer end 46. A retaining member 48 is inserted through the opening 46 in the arm 42 and is retained within a corresponding opening 50 in the mounting block 36. Preferably, the retaining member 48 includes an expanded head portion 52 sized larger than the opening 46 contained in the arm 42. A spring member 54 surrounds the shaft of the retaining member 48 to bias each of the gripper fingers 14 into an inward position. In the inward position, a ridge 56 on each of the gripper fingers 14 contacts the opposed ridge 56 to prevent further rotation of the gripper fingers 14 by the spring member 54. In the preferred embodiment of the invention, the spring member 54 is a precision instrument spring that exerts a known amount of bias force on each arm 42. This known amount of bias force exerted by the spring member 54 is important in preventing damage to the workpiece 34 as it is inserted into the guide blocks 22, as will be discussed in detail below.

As can be seen in FIG. 4, each of the gripper fingers 14 includes a pair of sensor access bores 58 within the main body 38. In the preferred embodiment of the invention, contact sensors 59 are positioned in the opposed sensor bores 58 such that if the insertion head 26 is operated and no workpiece 34 is positioned between the gripper fingers 14, the sensors will contact and signal that a workpiece is missing from between the gripper fingers 14.

As can be seen in FIGS. 3 and 4, each of the gripper fingers 14 includes a tapered face surface 60 that terminates at a bottom end 62. The bottom end 62 is preferably a flat surface. In the preferred embodiment of the invention, the gripper fingers 14 are constructed from ceramic, although other materials could be selected.

Figure 5:
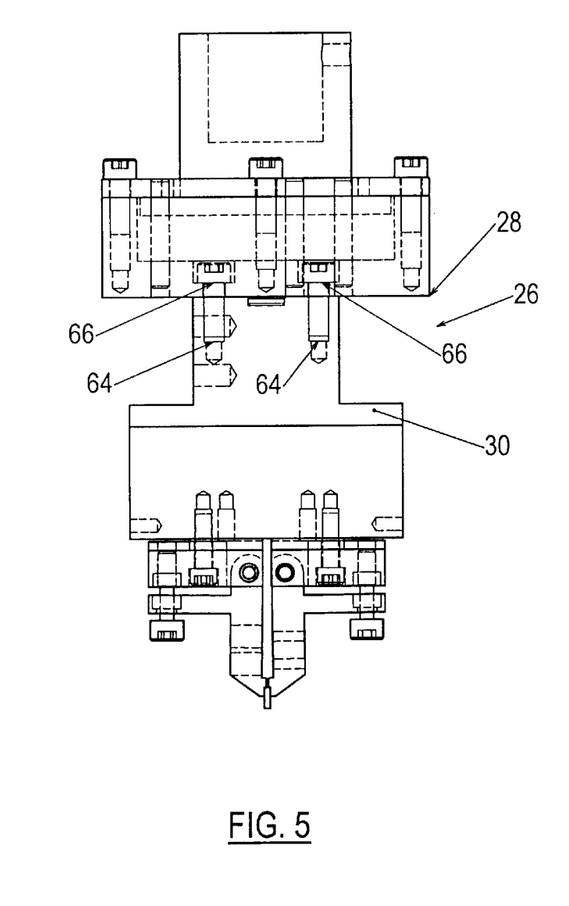
FIG. 5 is a side view of the insertion head of the present invention showing the internal configuration.

Referring now to FIG. 5, thereshown are the details of the upper portion 28. As can be seen, the intermediate drive section 30 is mounted by a series of connectors 64 within the upper portion 28. The upper portion 28 includes means for rotating the intermediate drive section 30, and thus the gripper fingers 14 about an axis of rotation passing through the center of the insertion head 26. The connectors 64 each include a head 66 that is upwardly movable within the upper portion 28. Thus, should the gripper fingers 14 contact an immovable object, continued downward movement of the insertion head 26 will allow the intermediate drive section 30 to move upward within the upper portion 28. In the preferred embodiment of the invention, at least one contact sensor is positioned between the upper portion 28 and the intermediate drive section 30 such that movement of the intermediate drive section 30 upward with respect to the upper portion 28 will generate a signal terminating further downward movement of the robot arm 12 to prevent damage of the gripper fingers 14 and the workpiece 34.

Figure 6:
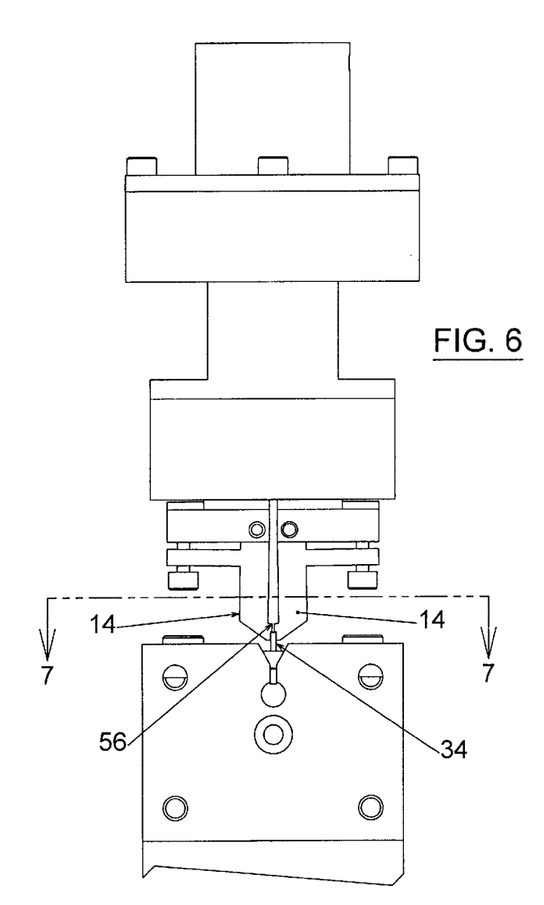
FIG. 6 is a side view of the insertion head of the present invention.
Figure 7:
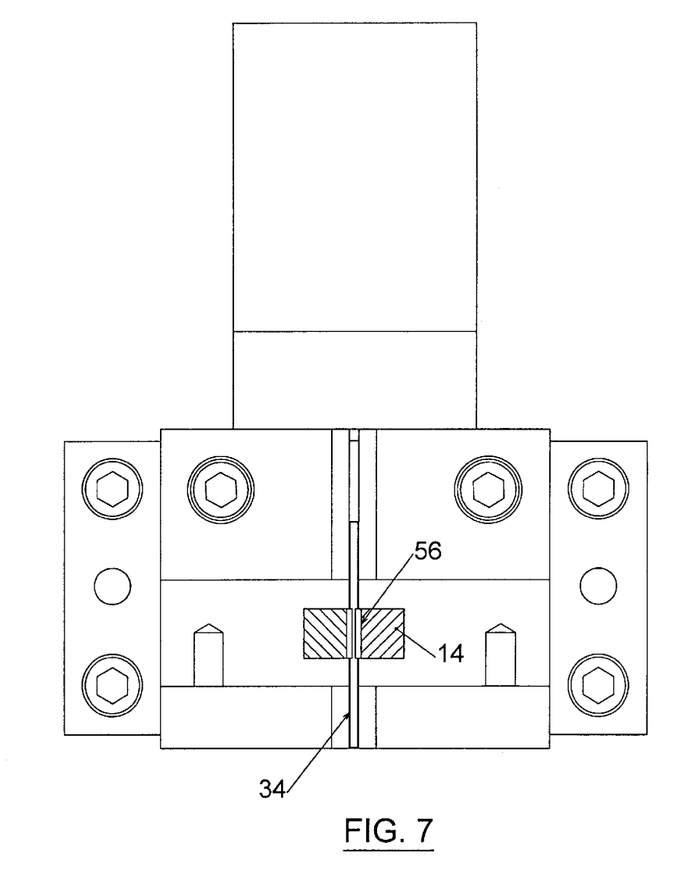
FIG. 7 is a sectional view taken along line 7—7 in FIG. 6 showing the gripper fingers of the present invention.

Referring now to FIGS. 6 and 7, thereshown is the position of the gripper fingers 14 when properly holding a workpiece 34. As can be seen in the figures, the top edge of the workpiece 34 is in contact with each of the ridges 56 contained on the gripper fingers 14. As best seen in FIG. 7, the distance between the ridges 56 is less than the thickness of the workpiece 34, such that the ridges 56 prevent further upward movement of the workpiece 34 between the gripper fingers 14.

Figure 8:
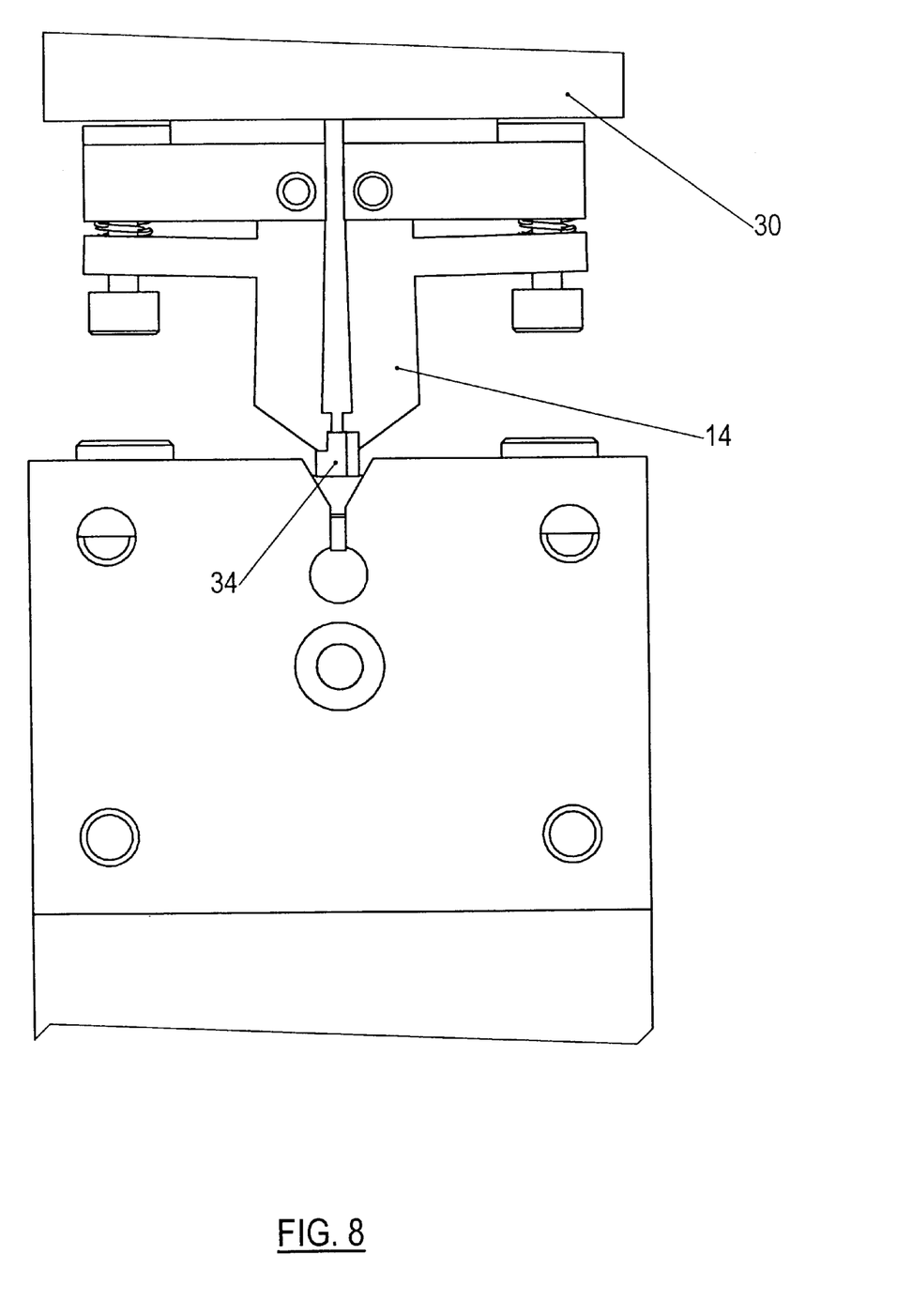
FIG. 8 is a side view of the insertion head when the workpiece is slightly rotated.
Figure 9:
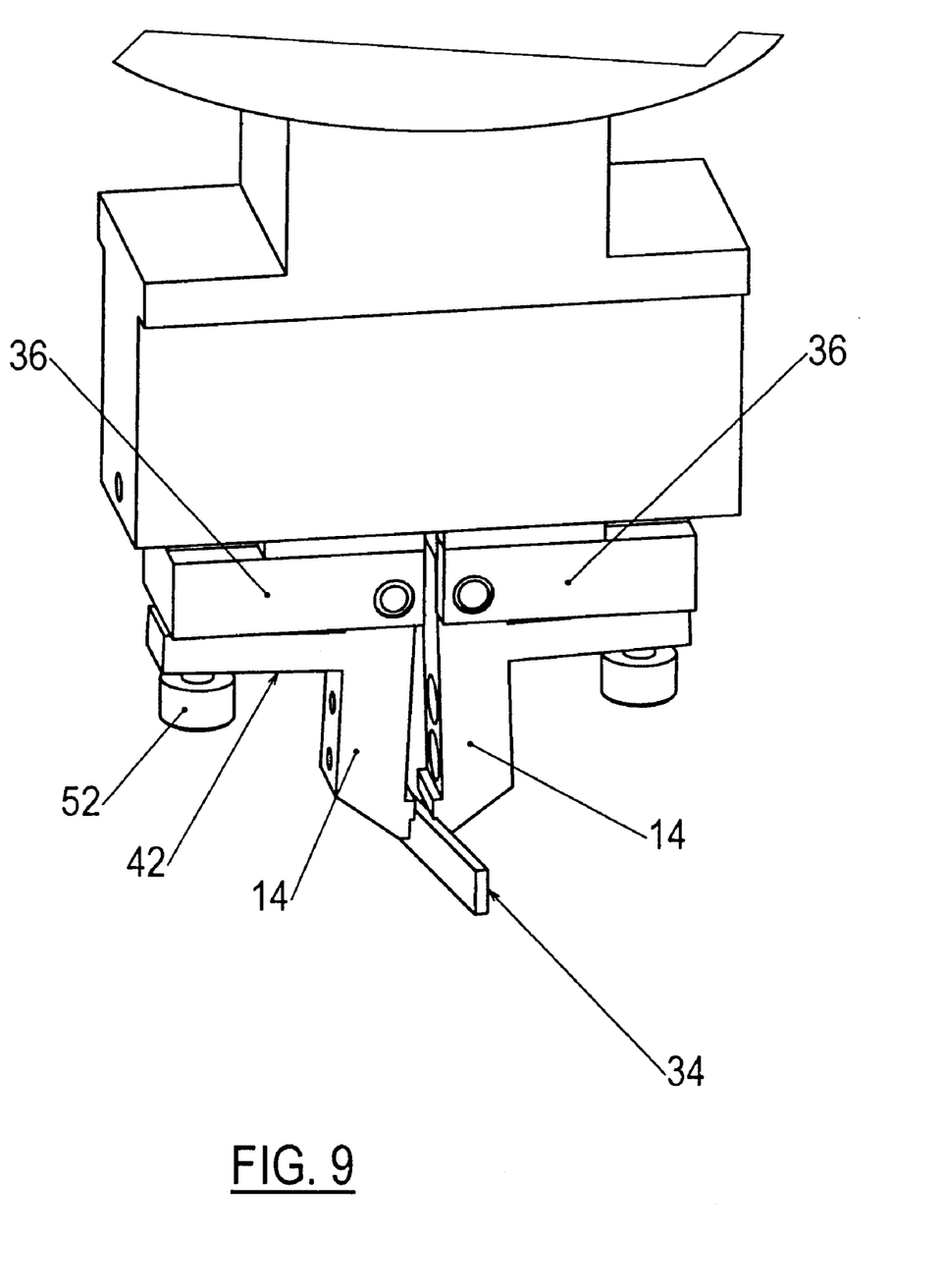
FIG. 9 is a detailed perspective view of the gripper fingers when the workpiece is deflected.
Figure 10:
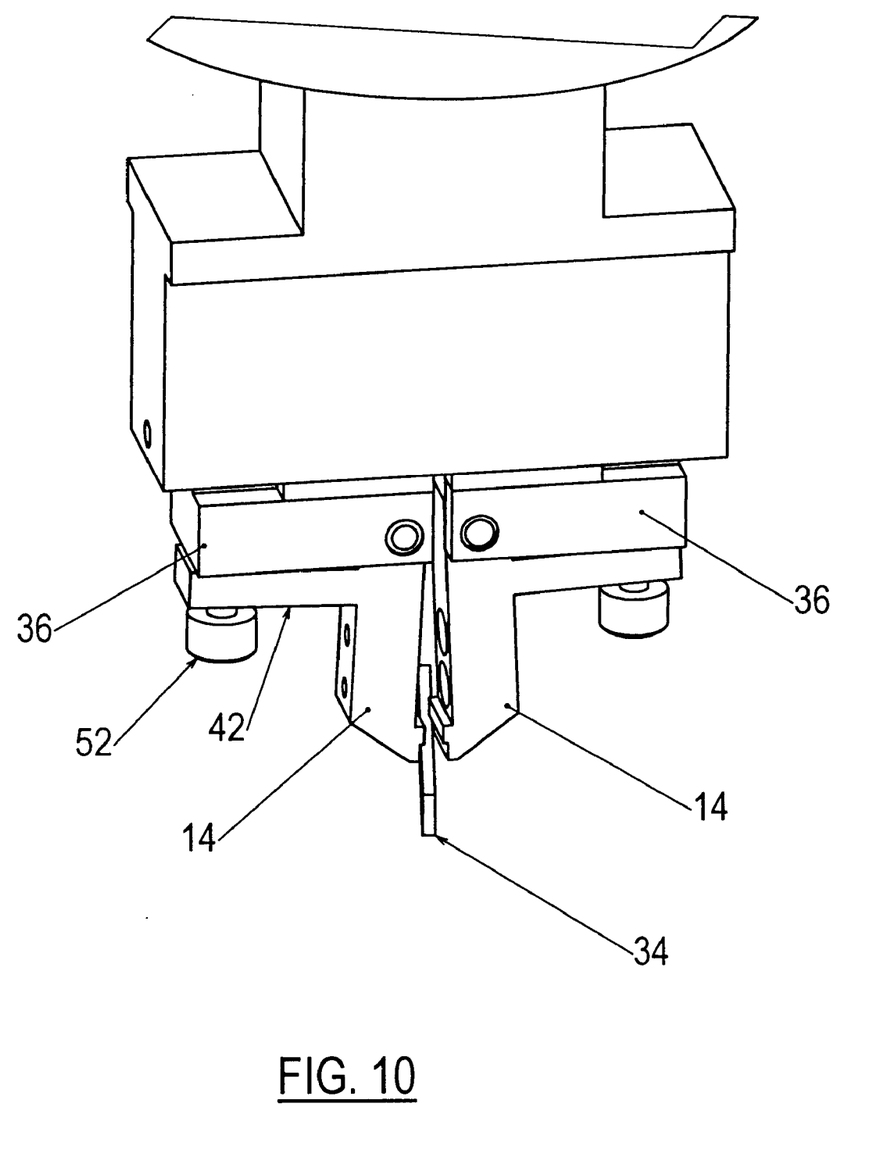
FIG. 10 is a view similar to FIG. 9 when the workpiece is rotated in the opposite direction.

Referring now to FIGS. 8 and 9, thereshown is the effect on the gripper fingers 14 when the workpiece 34 contacts a fixed object. As the workpiece 34 contacts a fixed object as the insertion head 26 is rotated, further rotation of the insertion head 26 causes the workpiece 34 to twist between the pair of gripper fingers 14. As the insertion head 26 continues to rotate, the force exerted by the workpiece 34 exerts an outward force on each of the gripper fingers 14. Since each of the gripper fingers 14 is pivotally mounted to a mounting block 36, further rotation of the insertion head 26 causes the gripper fingers 14 to flex outward against the bias force exerted by the spring member 54. In this manner, the gripper fingers 14 function to exert the required force to retain the workpiece 34 while being resiliently mounted to prevent fracture of the workpiece 34 during impeded rotation of the insertion head 26. FIG. 10 shows the effect of impeded rotation in an opposite direction to that shown in FIG. 9 to illustrate the bidirectional resilient mounting of the gripper fingers 14.

Referring back to FIGS. 1 and 2, the method of operation of the assembly mechanism 10 in assembling the workpieces 34 in a tightly spaced array within a receptacle will now be discussed. Initially, the robot assembly arm 12 is operated to position the insertion head 26 above a supply of workpieces (not shown) positioned on the supply station 16. In the preferred embodiment of the invention, the supply of workpieces 34 positioned on the supply station 16 are spaced relative to one another to permit the gripper fingers 14 to fit between adjacent workpieces.

After the insertion head 26 is moved into position, the intermediate drive portion 30 operates to move the mounting blocks 36, and thus the gripper fingers 14, to an extended position. The robot assembly arm 12 then moves the insertion head 26 downward into position above one of the workpiece 34. When in position, the intermediate drive portion 30 is operated to move the mounting blocks 36 inward into their retracted position. As the mounting blocks 36 are moved into their retracted position, the workpiece 34 is retained between the pair of gripper fingers 14 and in contact with each of the ridges 56 contained on the respective gripper finger 14. Each of the spring members 54 exerts a rotational bias force on one of the respective gripper fingers 14 to securely hold the workpiece 34 in place.

After the workpiece 34 has been selected, the robot assembly arm 12 moves the workpiece above the alignment station 18. The workpiece 34 is then released and pushed against a stop member within the alignment station 18. Once the workpiece has been pressed against the stop member in the alignment station 18, the insertion head 26 again picks up the workpiece 34 from the alignment station 18. However, since the workpiece 34 was pressed against a stop member having a known location, the insertion head 26 can pick up the workpiece 34 in a known position along the length of the workpiece 34. Thus, the assembly mechanism 10 knows the exact position of the workpiece 34 with respect to the gripper fingers 14.

After picking up the workpiece 34 from the alignment station 18, the robot assembly arm 12 moves the insertion head 26 above the guide block 22 in position A shown in FIG. 2. Position A is referred to as the insertion position for the rotatable platform 24. In position A, a receptacle (not shown) is positioned on the guide block 22.

Figure 11:
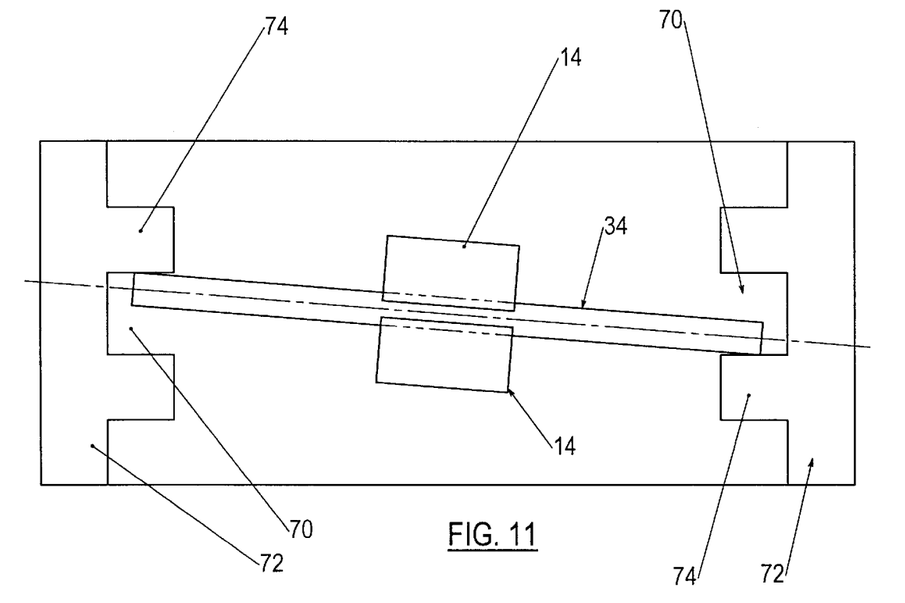
FIG. 11 is a top view showing rotation of the workpiece within the open slot in a first direction.
Figure 13:
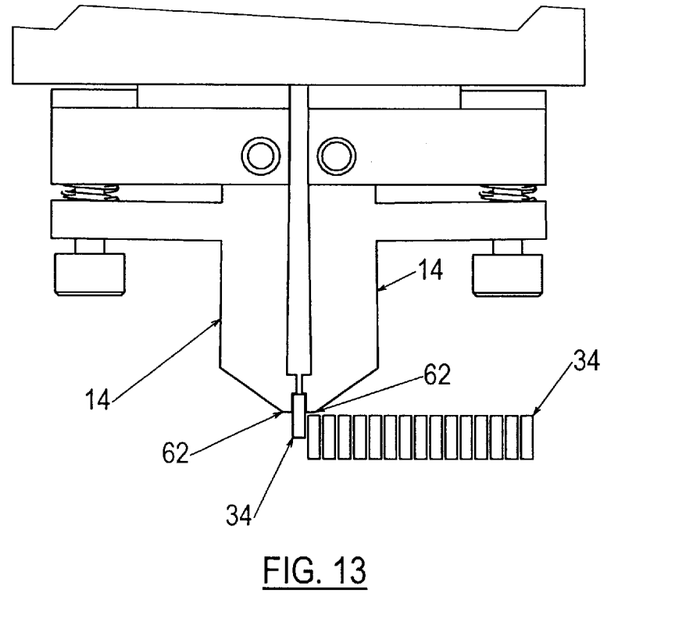
FIG. 13 is a side view of the gripper fingers inserting a workpiece into the tightly spaced array.

Initially, the assembly mechanism 10 presses the workpiece 34 downward into an open slot 70 within a receptacle on the guide block 22 as shown in FIG. 11. FIG. 11 is an exaggerated view of the open slot 70 as compared to the workpiece 34 for illustrative purposes. In the actual embodiment, the difference in width of the open slot 70 and the width of the workpiece 34 is significantly less than illustrated. As shown in FIG. 13, the plurality of workpieces 34 are positioned in a tightly spaced array having spaces between adjacent workpieces that are less than the width of each individual workpiece. In the embodiment of the invention shown, the width of each workpiece 34 is approximately ¹⁄₁₆ of an inch, while the spacing between each adjacent workpiece is 0.005 inches. Since the spacing between the adjacent workpieces is extremely small, simply pressing the workpiece 34 downward will cause the workpiece 34 to bind with the spacers 74 that define the open slots 70 between adjacent workpieces 34 and prevent further downward movement of the workpiece. If the robot assembly arm 12 simply continues to exert downward pressure on the workpiece 34, the downward force will cause the brittle workpiece 34 to fracture.

In accordance with the present invention, the insertion head 26 uses a dithering process to simulate the method of inserting workpieces 34 by a human worker. As shown in FIG. 11, robot arm 12 steps the insertion head 26 downward. Next, the upper portion 28 of the insertion head 26 rotates in a first direction (clockwise) as shown in FIG. 11. The spacer 74 contacts the workpiece 34 to prevent further rotation in the first direction. The upper portion 28 over-rotates the workpiece 34 such that the open slot 70 prevents rotation of the workpiece 34 before the upper portion 28 has reached its rotational limit. Since each of the gripper fingers 14 is resiliently mounted to its mounting block 36, rotation of the gripper fingers 14 when resistance is met results in flexing of the gripper finger 14 in a method as previously described.

Figure 12:
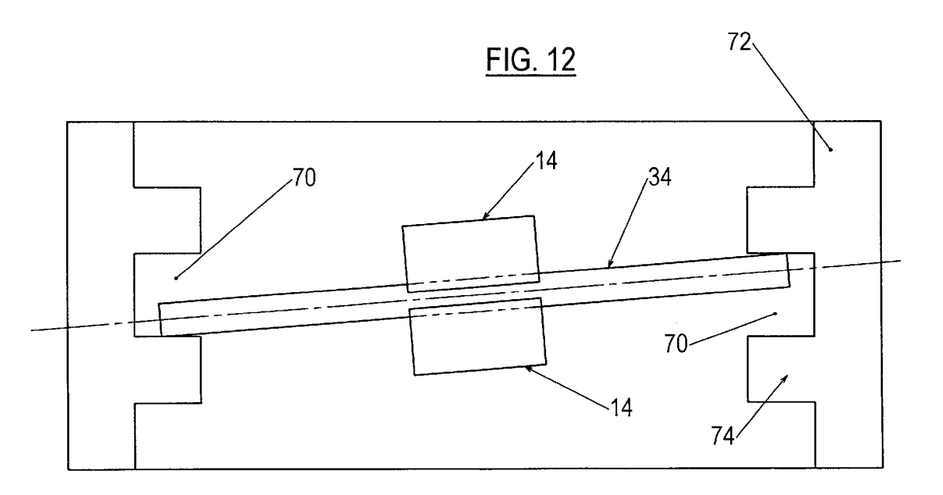
FIG. 12 is a top view showing rotation of the workpiece within the open slot in a second direction.

After the rotation of the workpiece is complete in the first direction, the upper portion 28 rotates the workpiece 34 in the opposite direction (counter-clockwise) as shown in FIG. 12. Again, the workpiece is over-rotated, causing the gripper fingers 14 to flex outward. This process is continuously repeated until the workpiece 34 is properly positioned between the spacing elements 74 defining the open slots 70 in the receptacle 72. As shown in FIG. 13, the bottom end 62 of each gripper finger 14 is significantly wider than the space between adjacent workpieces 34. Thus, once the workpiece 34 is pressed downward into the position shown in FIG. 14, the gripper fingers 14 must release the workpiece 34 in order to completely insert the workpiece 34 into the tightly spaced array.

Figure 14:
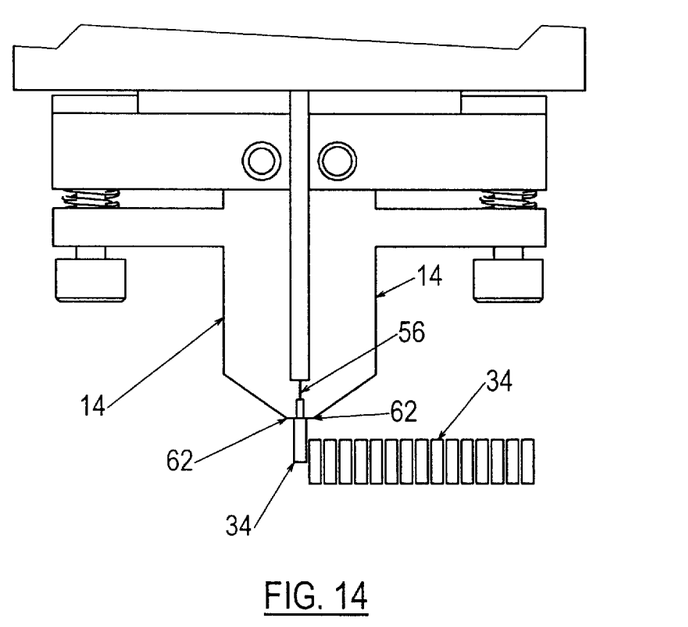
FIG. 14 is a side view showing the gripper fingers pressing the workpiece into the tightly spaced array.

FIG. 14 shows that once the workpiece 34 is positioned part way within the tightly spaced array, the gripper fingers 14 release the workpiece 34 and then completely close such that the ridges 56 on each of the gripper fingers 14 contact each other. In this position, the bottom end 62 of each gripper finger 14 is used to completely push the workpiece 34 downward into open slot 70 to define the tightly spaced array within the receptacle 72 as shown. Once the individual workpiece 34 has been inserted into the array, the process is repeated until the required number of workpieces 34 are inserted into the array. In the preferred embodiment of the invention, each array includes 16 workpieces.

Once a complete array is assembled in the inserting position shown by A in FIG. 2, the rotatable platform 24 moves the array within the receptacle to a heating station shown by B in FIG. 1. In the heating station, a layer of plastic contained on the receptacle is melted by a heating element to securely retain the array of workpieces in the tightly spaced arrangement created by the assembly mechanism 10. After the plastic retaining material has been melted and allowed to cool, the array of workpieces can be safely removed without disturbing the spaced relation between adjacent workpieces.

Once the array of workpieces have been removed from the insertion station 20, the rotatable platform 24 moves the guide block to position C in which an empty receptacle 72 is placed on the guide block 22. The receptacle 72 is thus ready to be loaded by the robot assembly arm 12 and insertion head 26.

Although the present invention has been described as utilizing sensing elements for an X-ray detector as the workpieces 34, it is contemplated by the inventor that the assembly mechanism 10 of the present invention could be used on a wide variety of workpieces where a need exists to align the workpieces in a specifically defined array.

Various alternatives and embodiments are contemplated as being within the scope of the following claims particularly pointing out and distinctly claiming the subject matter regarded as the invention.

I claim:

1. A method utilizing a robotic arm having a pair of gripper fingers each mounted to a mounting block movable between an extended position and a retracted position to position a plurality of workpieces in a tightly spaced array within a receptacle configured to retain the array of workpieces, the method comprising the steps of:

positioning a spring element between each gripper finger and the mounting block to which it is mounted, the spring element exerting a bias force on the gripper finger to force the gripper finger into a gripping position;

moving the mounting blocks into the retracted position to grasp one of the individual workpieces between the pair of gripper fingers;

moving the robotic arm to align the workpiece above an open slot in the receptacle, the open slot defined by spacing elements;

moving the robotic arm to press the workpiece partially into the open slot;

rotating the workpiece in a first direction until the workpiece contacts the spacing elements causing the gripper fingers to flex from the gripping position against the bias force of the spring element;

rotating the workpiece in a second, opposite direction until the workpiece contacts the spacing elements causing the gripper fingers to flex from the gripping position against the bias force of the spring element;

pressing the workpiece further into the open slot between the spacing elements; and repeating the steps of rotating the workpiece in the first direction, rotating the workpiece in the second direction, and subsequently pressing the workpiece into the open slot until the workpiece is positioned within the open slot.

2. The method of claim 1 further comprising the steps of:

further rotating the gripper fingers in the first direction after the workpiece contacts the spacing elements to cause the gripper fingers to flex against the spring element bias force and move from the gripping position; and further rotating the gripper fingers in the second direction after the workpiece contacts the spacing elements to cause the gripper fingers to flex against the spring element bias force and move from the gripping position.

3. The method of claim 2 wherein the step of pressing the workpiece into the open slot includes moving the robotic arm a predetermined distance after rotating the workpiece in the first direction and the second direction such that the workpiece is pressed the predetermined distance further into the open slot.

4. The method of claim 1 wherein the steps of rotating the workpiece in the first direction and the second direction and pressing the workpiece into the open slot are repeated until the gripper fingers contact one of the workpieces positioned immediately adjacent to the slot into which the workpiece is being inserted.

5. The method of claim 4 further comprising the steps of:

moving the gripper fingers from the retracted position to the extended position to release the workpiece after the workpiece is positioned within the open slot in the receptacle;

moving the gripper fingers away from the workpiece;

moving the gripper fingers from the extended position to the retracted position; and moving the gripper fingers into contact with the workpiece to press the workpiece completely into the open slot.

6. The method of claim 1 further comprising the steps of:

moving the workpiece into an alignment station;

moving the mounting blocks into the extended position to release the workpiece from the gripper fingers into the alignment station;

moving the robotic arm to press the workpiece against a stop member in the alignment station; and moving the mounting blocks into the retracted position to regrip the workpiece at a known position determined by the stop member.

7. A method utilizing a robotic arm having a pair of gripper fingers each mounted to a mounting block movable between an extended position and a retracted position to position a plurality of workpieces in a tightly spaced array within a receptacle configured to retain the array of workpieces, the method comprising the steps of:

positioning a spring element between each gripper finger and the mounting block to which it is mounted, the spring element exerting a bias force on the gripper finger to force the gripper finger into a gripping position;

moving the mounting blocks into the retracted position to grasp one of the individual workpieces between the pair of gripper fingers;

moving the robotic arm to align the workpiece above an open slot in the receptacle, the open slot defined by spacing elements;

moving the robotic arm downward to press the workpiece partially into the open slot;

rotating the workpiece in a first direction until the workpiece contacts the spacing elements;

further rotating the gripper fingers in the first direction to cause the gripper fingers to flex against the spring element bias force and move from the gripping position;

pressing the workpiece downward a predetermined distance to insert the workpiece further into the open slot between the spacing elements;

rotating the workpiece in a second, opposed direction until the workpiece contacts the spacing elements;

further rotating the gripper fingers in the second direction to cause the gripping fingers to flex against the spring element bias force and move from the gripping position;

pressing the workpiece downward for the predetermined distance to further insert the workpiece into the open slot between the spacing elements; and repeating the steps of rotating the workpiece and pressing the workpiece into the open slot until the workpiece is substantially contained within the open slot.

8. The method of claim 7 wherein the workpiece is substantially inserted into the open slot when the gripper fingers contact one of the workpieces positioned immediately adjacent to the open slot when the workpiece is still gripped by the gripper fingers.

9. The method of claim 8 further comprising the steps of:

releasing the workpiece by moving the mounting blocks from the retracted position to the extended position when the workpiece is substantially inserted into the open slot;

raising the gripper fingers above the workpiece;

moving the mounting blocks from the extended position to the retracted position; and pressing the gripper fingers into contact with the workpiece to force the workpiece completely into the open slot.

10. The method of claim 7 further comprising the steps of:

sensing the movement of each gripper finger from the gripping position; and terminating the rotation of the workpiece in response to the detection of movement of the gripper finger from the gripping position.

* * * * *